(12) United States Patent
Goto et al.

(10) Patent No.: US 11,325,598 B2
(45) Date of Patent: May 10, 2022

(54) TRAVEL ASSISTANCE METHOD AND TRAVEL ASSISTANCE DEVICE

(71) Applicant: Nissan Motor Co., Ltd., Yokohama (JP)

(72) Inventors: Akinobu Goto, Kanagawa (JP); Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 3 days.

(21) Appl. No.: 17/257,752

(22) PCT Filed: Jul. 6, 2018

(86) PCT No.: PCT/IB2018/000923
§ 371 (c)(1),
(2) Date: Jan. 4, 2021

(87) PCT Pub. No.: WO2020/008225
PCT Pub. Date: Jan. 9, 2020

(65) Prior Publication Data
US 2021/0188268 A1      Jun. 24, 2021

(51) Int. Cl.
*B60T 8/32* (2006.01)
*B60W 30/14* (2006.01)
*B60K 31/00* (2006.01)
*B60W 30/18* (2012.01)

(52) U.S. Cl.
CPC .......... *B60W 30/143* (2013.01); *B60K 31/00* (2013.01); *B60W 30/181* (2013.01); *B60W 2555/60* (2020.02); *B60W 2720/10* (2013.01)

(58) Field of Classification Search
CPC ............. B60W 30/143; B60W 30/181; B60W 2555/60; B60W 2720/10; B60K 31/00
See application file for complete search history.

(56) References Cited

U.S. PATENT DOCUMENTS

2013/0110316 A1*  5/2013  Ogawa ............. G08G 1/096725
                                                701/1

FOREIGN PATENT DOCUMENTS

| JP | 2005-028995 A | 2/2005 |
| JP | 2011-253379 A | 12/2011 |
| JP | 2015-129701 A | 7/2015 |
| JP | 2016-103131 A | 6/2016 |
| JP | 2016-141387 A | 8/2016 |

* cited by examiner

*Primary Examiner* — Adam M Alharbi
(74) *Attorney, Agent, or Firm* — Young Basile Hanlon & MacFarlane, P.C.

(57) ABSTRACT

A travel assisting method for a vehicle which is executed by a processor, comprising: generating a vehicle speed command value based on vehicle information of a subject vehicle; calculating the vehicle speed command value at a predetermined time (a look-ahead time) ahead of a current time based on information of a feature existing ahead of the subject vehicle in a travelling direction, as a look-ahead vehicle speed command value; and controlling the subject vehicle based on the look-ahead vehicle speed command value. Further, a lighting state of a traffic light located around the subject vehicle is detected, and the look-ahead time is set based on the lighting state.

10 Claims, 9 Drawing Sheets

TRAVEL ASSISTANCE METHOD AND TRAVEL ASSISTANCE DEVICE

TECHNICAL FIELD

The present invention relates to a travel assisting method and a travel assisting device for controlling travel of a vehicle.

BACKGROUND

A driving assistance device is known in which forward environmental information is acquired by recognizing environment in front of a vehicle; forward recognizable distance is estimated based on the forward environmental information; a velocity that a braking distance is within the forward recognizable distance is calculated as a speed limit; when a preceding vehicle exists, a vehicle speed to follow the preceding vehicle with maintaining a predetermined vehicle-to-vehicle distance is set as a target vehicle speed; when the preceding vehicle does not exist, a predetermined vehicle speed is set as the target vehicle speed; and these target vehicle speeds are limited to be at least the speed limit or less (for example, JP 2016-141387 A).

SUMMARY

However, in the above-mentioned prior art, there is a problem that, for example, when a lighting state of a traffic light set ahead of the vehicle is in a state instructing to stop and the preceding vehicle disappears due to a lane change, although the lighting state of the traffic light ahead instructs to stop, unnecessary acceleration occurs.

The problem to be solved by the present invention is to provide a travel assisting method and travel assisting device that can inhibit unnecessary velocity control.

The present invention generates a vehicle speed command value based on vehicle information of the subject vehicle; calculates a look-ahead vehicle speed command value at a predetermined time (a look-ahead time) ahead of the current time based on information of a feature existing ahead of the subject vehicle in a travelling direction; and controls the subject vehicle based on the look-ahead vehicle speed command. Further, the above-mentioned problem is solved by detecting a lighting state of a traffic light located around the subject vehicle; and setting the look-ahead time based on the lighting state.

According to the present invention, the unnecessary velocity control is inhibited.

DETAILED DESCRIPTION

Hereinafter, a travel assisting device for a vehicle and a method thereof according to an embodiment of the present invention will be explained with reference to the drawings. Incidentally, in the present embodiment, the present invention will be described by exemplifying a travel assisting device mounted on a vehicle.

First Embodiment

Figure 1:
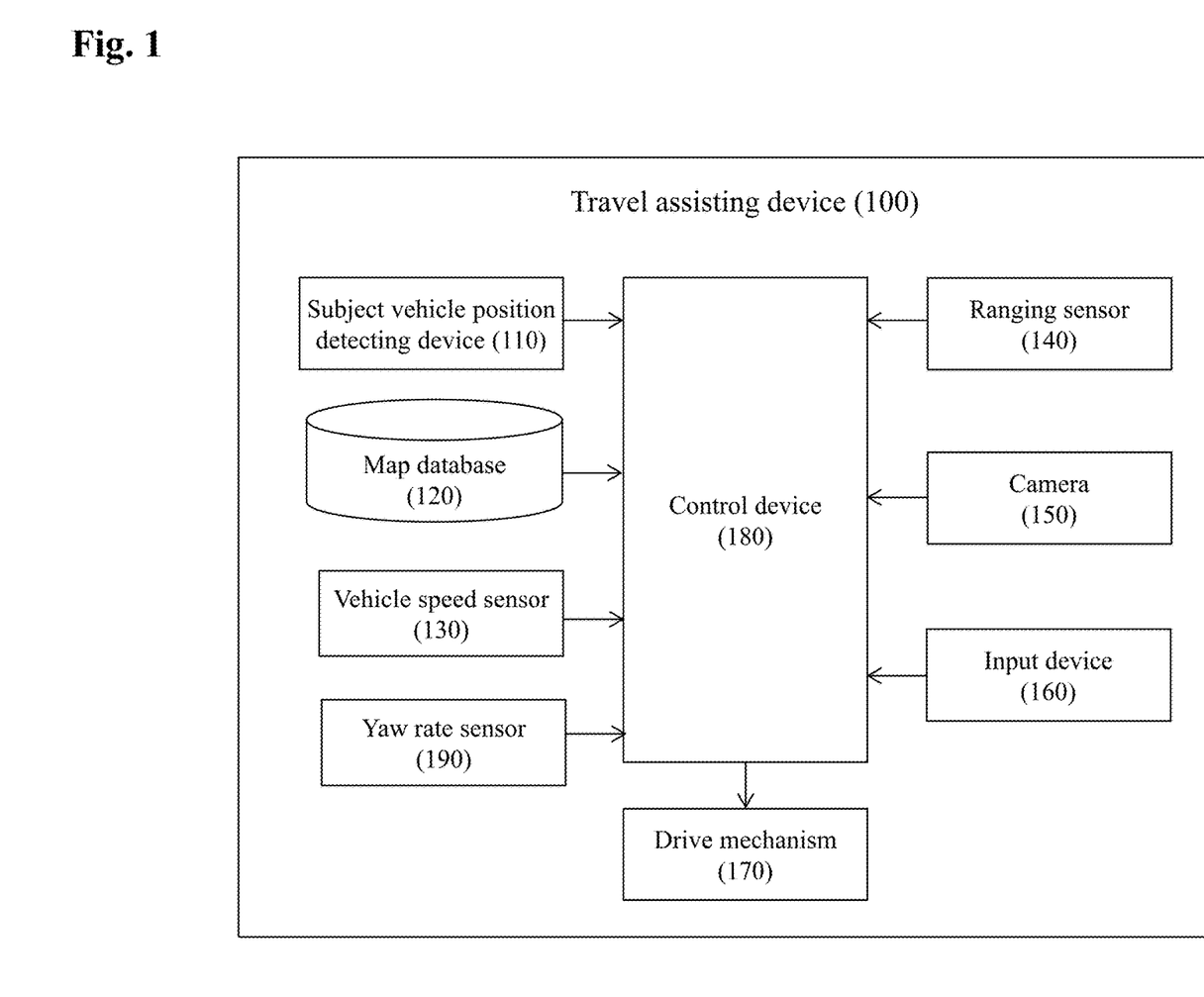
FIG. 1 is a block diagram illustrating a travel assisting device according to an embodiment of the present invention.

FIG. 1 is a diagram illustrating a configuration of a travel assisting device 100 of a vehicle according to an embodiment of the present invention. As shown in FIG. 1, the travel assisting device 100 according to the present embodiment comprises a subject vehicle position detecting device 110, a map database 120, a vehicle speed sensor 130, a ranging sensor 140, a camera 150, a drive mechanism 170, a control device 180, and a yaw rate sensor 190. These components are connected to one another via a controller area network (CAN) or other in-vehicle LAN for mutually exchanging information.

The subject vehicle position detecting device 110 comprises a GPS unit that detects radio waves transmitted from a plurality of satellite communications by a locator (a GPS antenna) to periodically acquire positional information of the subject vehicle, and also detects the current position of the subject vehicle based on the acquired positional information of the subject vehicle, angle change information acquired from a gyro sensor, and a vehicle speed acquired from the vehicle speed sensor. The subject vehicle position detection device 110 may detect the position of the subject vehicle by using a well-known map matching technique.

The map database 120 contains map information. In map information stored in the map database 120, information of road shapes in respective map coordinates, for example, attributes relating to curves, slopes, intersections, interchanges, narrow roads, straight roads, road shoulder structures, and merge points are recorded in association with map coordinates. Further, the map information includes information on a feature such as stop lines and road signs. The road sign is, for example, a sign indicating that there is a traffic light or a sign indicating that the vehicle should stop, and the like.

The vehicle speed sensor 130 measures a rotational speed of a drive system, such as a drive shaft, and detects a traveling speed of the subject vehicle (hereinafter, also referred to as a vehicle speed) based on the measured rotational speed. The vehicle speed of the subject vehicle detected by the vehicle speed sensor 130 is outputted to the control device 180. The yaw rate sensor 190 is mounted in an appropriate place in a vehicle interior and detects a yaw rate of the subject vehicle (a change rate of a rotation angle in a turning direction). Detected yaw rate information of the subject vehicle is outputted to the control device 180.

The ranging sensor 140 detects objects present around the subject vehicle. Further, the ranging sensor 140 calculates a relative distance and a relative velocity between the subject vehicle and the object. Information of the object detected by the ranging sensor 140 is transmitted to the control device 180. The ranging sensor 140 includes LRFs, such as a laser radar, a millimeter-wave radar, or the like.

The camera 150 captures the features such as roads and object existing around the subject vehicle. In this embodiment, the camera 150 images the front of the subject vehicle. Image information captured by the camera 150 is transmitted to the control device 180. The camera 150 is a camera for imaging the front of the subject vehicle and/or a camera for imaging the side of the subject vehicle.

The input device 160 is an operating member that can be operated by a driver. In the present embodiment, the driver sets an on/off of autonomous drive control by operating the input device 160. In the autonomous drive control of vehicles according to the present embodiment, when a preceding vehicle exists in front of the subject vehicle, a vehicle-to-vehicle distance control (a preceding vehicle following control) is performed for the subject vehicle travelling so that a vehicle-to-vehicle distance between the subject vehicle and the preceding vehicle is maintained at the vehicle-to-vehicle distance set by the driver, and the subject vehicle follows the preceding vehicle. When a preceding vehicle does not exist in front of the subject vehicle, a speed control is performed for the subject vehicle travelling at a vehicle speed set by the driver. In the present embodiment, the driver operates the input device 160 thereby to set a set vehicle speed of the subject vehicle (for example, a specific speed value) in the speed control and a set vehicle-to-vehicle distance in the vehicle-to-vehicle distance control (for example, any one of the three stages of a short distance, a medium distance and a long distance).

The drive mechanism 170 includes engines and/or motors (power systems), brakes (braking systems), and steering actuators (steering systems), etc., for autonomous driving of the subject vehicle. In the present embodiment, when the autonomous driving control to be described later is performed, operation of the drive mechanism 170 is controlled by the control device 180.

The control device 180 is a computer having a processor and comprises a ROM (Read Only Memory) that stores a program for controlling the travelling of the subject vehicle, a CPU (Central Processing Unit) that executes a program stored in the ROM, and a RAM (Random Access Memory) that functions as an accessible storage device. Incidentally, as an operation circuit, a micro processing unit (MPU), a digital signal processor (DSP), an application specific integrated circuit (ASIC), a field programmable gate array (FPGA) and the like can be used as substitute for or in addition to the CPU.

The control device 180 executes the programs stored in the ROM, thereby realizing: a stop line distance acquiring function; a traffic light lighting state detecting function; a vehicle speed command value generating function; and a travel controlling function (including an autonomous following function) for controlling the travel of the subject vehicle. In the following, the functions of the control device 180 is explained. Incidentally, in addition to the functions described below, the control device 180 has other functions such as an estimating function for detecting a position of the subject vehicle.

The control device 180 acquires information of the stop line located ahead in a travelling direction of the subject vehicle by the stop line distance acquiring function. The stop line is, for example, a line drawn on roads near the traffic light. The control device 180 acquires the information of the stop line based on data detected by the sensors mounted on the vehicle such as the ranging sensor 140, the camera 150, and the like. The information of the stop line contains at least positional information of the stop line. When the map information stored in the map database 120 contains the information of the stop line, the control device 180 may acquire the information of the stop line from the map information. The information of the stop line is not necessarily limited to white lines drawn on roads. For example, when the distance from the current position of the subject vehicle to the stop line is long and the stop line is not captured by the camera 150, the control device 180 may acquire, for example, the information of the intersection or a railroad crossing as the information of the stop line information. In other words, since the stop line is applied to the vicinity of the intersection or the railroad crossing, information of the intersections and the like may be used as the information of the stop line. The control device 180 estimates the position of the subject vehicle on the map based on the position of the subject vehicle detected by the subject vehicle position detecting device 110 and the map information. Then, the control device 180 calculates a stop line distance from the current position of the subject vehicle to the stop line.

The control device 180 detects the lighting state of the traffic light located around the subject vehicle by the traffic light lighting state detecting function. The traffic light is set for the intersection, crossing, highway interchange, and the like. The lighting state of the traffic light is a stop instruction, a through instruction, a slow-running instruction, etc., and is distinguished by colors displayed on the traffic light, forms of lighting, and the like. For example, the control device 180 detects the color of an indicating lamp of the traffic light located ahead the subject vehicle from the captured image of the camera 150. When the indicating lamp of the traffic light is "red", the lighting state is the stop instruction. When the indicating lamp of the traffic light is "blue (green)" or "yellow", the lighting state is the through instruction. Incidentally, in the following travel assisting control, when the indicating lamp of the traffic light is "yellow", the lighting state may be determined to be in a state instructing to stop.

The control device 180 generates the vehicle speed command value based on vehicle speed information of the subject vehicle by the vehicle speed command value generating function. The vehicle speed command value is a target value of the vehicle speed (a target vehicle speed) for controlling the vehicle speed of the subject vehicle. For example, when the subject vehicle travels at the set vehicle speed set by the driver, the control device 180 calculates the vehicle speed command value based on information of the set vehicle speed entered by a user. Further, when the autonomous driving control is executed such that the subject vehicle follows the preceding vehicle while maintaining the vehicle-to-vehicle distance between the subject vehicle and the preceding vehicle, the control device 180 acquires the vehicle speed information of the preceding vehicle by using the onboard sensor such as the camera 150 to generate the vehicle speed command value based on the vehicle speed information of the preceding vehicle. In addition, when the subject vehicle is controlled by the autonomous driving control, the control device 180 acquires information of a legal speed limit for a lane on which the subject vehicle is currently travelling from the map information, and generates the vehicle speed command value so that the vehicle speed of the subject vehicle is equal to or less than an upper limit speed based on the legal speed limit.

The control device 180 controls the drive mechanism 170 by the travel controlling function so as to execute the autonomous driving control that autonomously performs all or a part of the travel of the subject vehicle so that the subject vehicle travels on a target travelling route. For example, when the preceding vehicle exists in front of the subject vehicle, the travel controlling function of this embodiment controls the working of the drive mechanism 170 such as the engine or brake so as to execute the vehicle-to-vehicle distance control in which the subject vehicle travels the vehicle-to-vehicle distance which is set by the vehicle-to-vehicle distance setting function away from the preceding vehicle. Further, when a preceding vehicle exists ahead of the subject vehicle, the control device 180 controls the working of the drive mechanism 170 such as the engine, brake, and steering actuator, so that the vehicle-to-vehicle distance between the subject vehicle and the preceding vehicle are set to the vehicle-to-vehicle distance set by the vehicle-to-vehicle distance setting function, and the subject vehicle travels to follow the travelling trajectory traveled by the preceding vehicle. Furthermore, when no preceding vehicle exists in front of the subject vehicle, the control device 180 controls the working of the drive mechanism 170 such as the engine and the brake so as to execute a speed control in which the subject vehicle travels at a predetermined set speed set by the driver. Incidentally, the autonomous driving control by the travel controlling function is performed in compliance with the traffic laws and regulations of each country.

Figure 2:
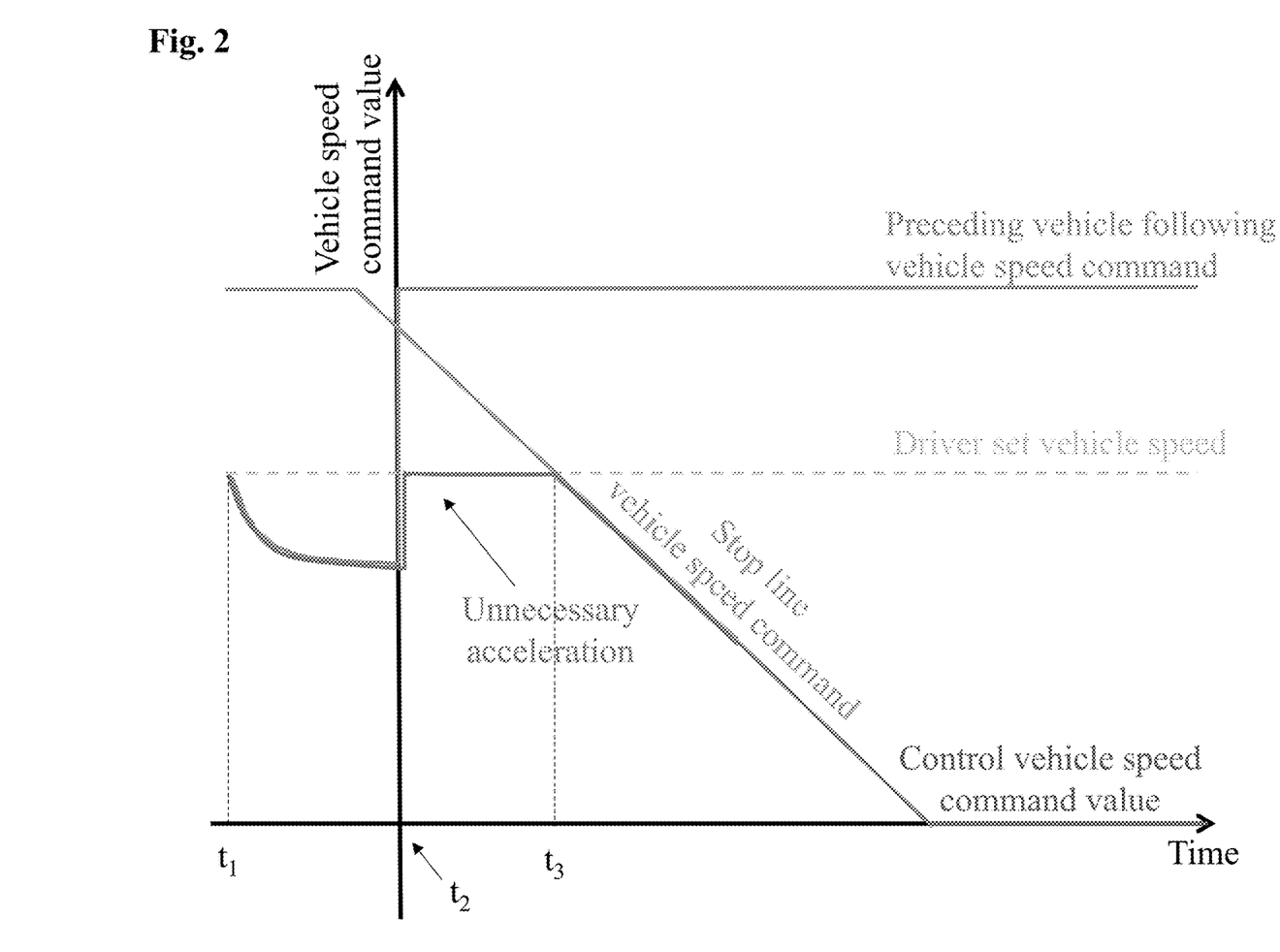
FIG. 2 is a graph for explaining characteristics of the vehicle speed command value.

A autonomous following control and a decelerating control when the stop line is detected to stop in front of the stop line will be explained with reference to FIG. 2. FIG. 2 is a graph illustrating characteristics of the vehicle speed command value when the preceding vehicle makes a lane change while the subject vehicle follows the preceding vehicle. In FIG. 2, the horizontal axis indicates the time, and the vertical axis indicates the vehicle speed command value. The vehicle speed command value corresponds to the vehicle speed controlled under the autonomous driving control.

The subject vehicle is following the preceding vehicle by the autonomous driving control. An intersection exists in front of the subject vehicle and the preceding vehicle. For example, at the time $t_1$, the driver of the preceding vehicle visually notices the intersection and slows down the vehicle. The subject vehicle also decelerates the subject vehicle to follow the preceding vehicle. It is supposed that at the time of the time $t_2$, the preceding vehicle makes the lane change for any reason. At this point, however, since the distance from the current position of the subject vehicle to the intersection is longer than the traffic light recognizing distance, the subject vehicle does not detect the features near the intersection with the ranging sensor 140, the camera 150, and the like. When the preceding vehicle disappears from the front of the subject vehicle, the control device 180 increases the current vehicle speed to the vehicle speed set by the driver. Thus, the vehicle speed of the subject vehicle increases after the time $t_2$. Then, at the time of time $t_3$ or between the time $t_2$ and the time $t_3$, the travel assisting device 100 detects the stop line near the intersection by the onboard sensor. The control device 180 calculates the distance from the current position of the subject vehicle to the stop line and compares a braking distance according to the current vehicle speed and the stop line distance.

In the example of FIG. 2, since the braking distance becomes equal to the stop line distance at the time $t_3$, the control device 180 calculates the vehicle speed command value so that a control vehicle speed command of the subject vehicle corresponds to the stop line vehicle speed command to stop the subject vehicle before the stop line. The stop line vehicle speed command is a command value determined by the braking distance or the like and is a command value for stopping the subject vehicle in front of the stop line.

As described above, in the example of FIG. 2, although the stop line exists in front of the subject vehicle, unnecessary acceleration occurs between the time $t_2$ and the time $t_3$. In the present embodiment, in order to avoid such unnecessary acceleration, when the features (e.g., the stop line) that affects the vehicle speed control exist ahead of the subject vehicle in a travelling direction of the subject vehicle, the vehicle speed at a predetermined time ahead of the current time is calculated to look ahead the vehicle speed. The control device 180 predicts the vehicle speed at a time ahead of the current time. A time at predetermined time ahead of the current time is a look-ahead time.

Figure 3:
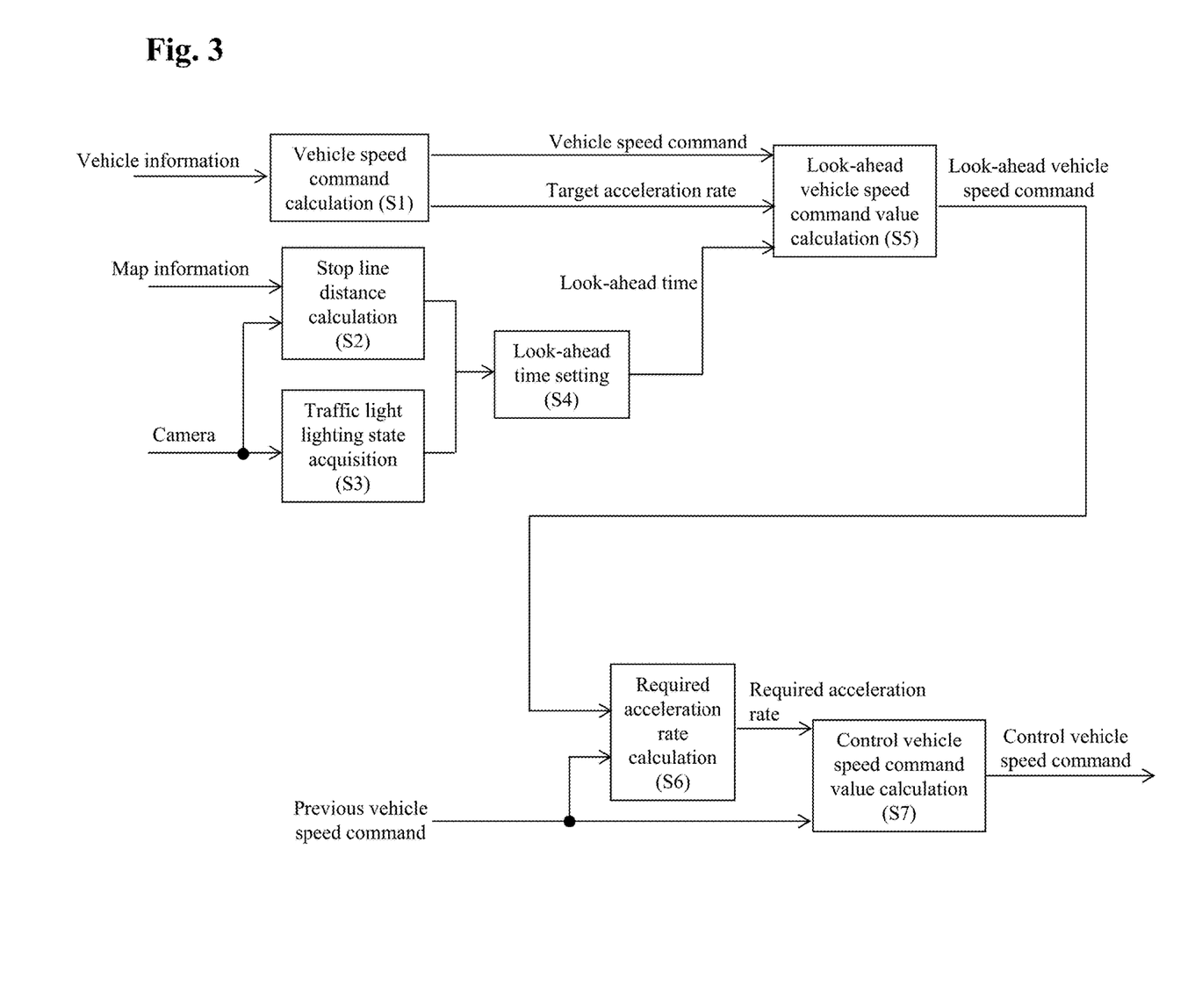
FIG. 3 is a block diagram for explaining a flowchart of a travel assisting process in the control device of FIG. 1.

Next, a control process for assisting the travelling of the vehicle is described. FIG. 3 is a block diagram illustrating a flow of the control process of the present embodiment. The travel control process explained below is executed by the control device 180. Further, the travel control process explained below starts when the ignition switch or power switch is turned on and is executed repeatedly (e.g., every 10 milliseconds) at a predetermined cycle until the ignition switch or power switch is turned off.

The following explanation is based on an exemplary scene in which the autonomous travel control is input (turned on) by the driver. In other words, when the driver turns the autonomous driving control on via the input device 160, and the preceding vehicle exists in front of the subject vehicle, the autonomous following control to follow the preceding vehicle is executed while the subject vehicle driver is the set vehicle-to-vehicle distance, which is set by the driver, away from the preceding vehicle.

In a step S1, the control device 180 calculates the vehicle speed command value based on the vehicle information. The vehicle information is the vehicle speed information detected by the vehicle speed sensor 130, the data detected by sensors such as the ranging sensor 140, 150, manipulation information of the input device 160 operated by the user, the map information, and the like. For example, when the subject vehicle follows the preceding vehicle, the control device 180 uses the onboard sensor to acquire information of the preceding vehicle as the vehicle information and calculates the vehicle speed of the preceding vehicle. The control device 180 compares the current vehicle speed with the vehicle speed of the preceding vehicle and calculates the vehicle speed command value and a target acceleration rate so that the current vehicle speed corresponds to the vehicle speed of the preceding vehicle. In addition, when controlling with the vehicle speed set by the driver, the control device 180 acquires the information of the vehicle speed from the input device 160 and calculates the vehicle speed command value and the target acceleration rate so that the current vehicle speed corresponds to the vehicle speed set by the driver.

Further, when the features to stop the vehicle are detected ahead of the subject vehicle in the travelling direction and/or when information of the stop line existing ahead of the subject vehicle in the travelling direction is acquired from the map information and the like, the control device 180 measures the stop line distances that is a distance from the current position of the subject vehicle to the stop line. The control device 180 acquires the information of the current vehicle speed and calculates the braking distance. The control device 180 calculates the vehicle speed command value and the target acceleration rate based on the stop line distance, the braking distance, and the current vehicle speed information so that the subject vehicle stops before the stop line.

In a step S2, the control device 180 acquires the information of the stop line located ahead of the subject vehicle in the travelling direction from the map information and/or the captured image of the camera 150 by the stop line acquiring function, and calculates the distance from the current position of the subject vehicle to the stop line.

In a step S3, the control device 180 detects the lighting state of the traffic light from the captured image of the camera 150. Incidentally, the information of the lighting state of the traffic light may be acquired not limited to by the captured image of the camera 150, but for example, by inter-vehicle communication or by roadside-to-vehicle communication.

In a step S4, the control device 180 sets the look-ahead time based on the lighting state of the traffic light. The length of the look-ahead time is preset according to the lighting state of the traffic light. When the lighting state is the stop instruction, the control device 180 sets the look-ahead time to a longer period. Namely, when the lighting state is the stop instruction, the control device 180 increases the look-ahead time compared to when the lighting state is an indication other than the stop instruction. When the lighting state is an indication other than the stop instruction (e.g., the through instruction), the control device 180 sets the look-ahead time to a shorter period. In addition, when the lighting state cannot be detected, the control device 180 sets the look-ahead time to a shorter period than that set when the lighting state can be detected. The control device 180 may set the look-ahead time depending on a magnitude of the current vehicle speed. For example, when the lighting state is the stop instruction and the vehicle speed is high, the control device 180 may set the look-ahead time longer to safely stop in front of the traffic light.

In a step S5, the control device 180 calculates the look-ahead vehicle speed command value based on the vehicle speed command value, the target acceleration rate, and the look-ahead time. When the look-ahead time is set, the control device 180 predicts existence of the stop line to be reached at a time at which the look-ahead time is elapsed from the current time. When the subject vehicle accelerates, the control device 180 calculates the look-ahead vehicle speed command value so that the acceleration is hindered. At this time, when the look-ahead time is long, since the vehicle speed control to hinder the acceleration starts at a position far from the position of the stop line, the vehicle speed changes at a gentle slope. On the other hand, when the look-ahead time is short, since the vehicle speed control to hinder the acceleration starts at a position that the position of the subject vehicle is close to the position of the stop line, the timing to hinder the acceleration becomes later than that when the look-ahead time is long. Therefore, the vehicle speed changes with a larger slope than that when the look-ahead time is long.

The control device 180 predicts the existence of the stop line to be reached at a time at which the look-ahead time is elapsed from the current time. When the subject vehicle is decelerated, the control device 180 calculates the look-ahead vehicle speed command value so that the timing to start the deceleration changes according to the length of the look-ahead time. When the look-ahead time is long, since the deceleration starts from a position at which the position of the subject vehicle is far from the stop line, the timing to start the deceleration is put forward. On the other hand, when the look-ahead time is short, since the deceleration starts from a position at which the position of the subject vehicle is close to the stop line, the timing to start the deceleration is delayed and an amount of the deceleration is reduced. In other words, when the look-ahead time is short, the timing to start the deceleration is delayed and the amount of the deceleration becomes smaller than that when the look-ahead time is long.

When the look-ahead time is not set, the control device 180 calculates the vehicle speed command value based on the vehicle speed command value and the target acceleration rate calculated in the step S1 of the control process.

In a step S6, the control device 180 calculates the required acceleration rate required to correspond the current vehicle speed with the look-ahead vehicle speed command value based on a difference between the look-ahead vehicle speed command value and the vehicle speed command value calculated in the previous cycle (previous vehicle speed command value). Incidentally, the control device 180 may set a limit value with respect to the change amount of the vehicle speed to avoid a sudden change of the vehicle speed. For example, in accelerating the subject vehicle, when a difference between the look-ahead vehicle speed command value and the vehicle speed command value calculated in the previous cycle (the previous vehicle speed command value) is greater than a predetermined upper limit value, the control device 180 calculates the required acceleration rate so that the change amount of the vehicle speed is equal to or less than the upper limit value.

In a step S7, the control device 180 calculates the control vehicle speed command value by adding the required acceleration rate to the vehicle speed command value calculated in the previous cycle (the previous the vehicle speed command value). Then, the control device 180 outputs the control vehicle speed command value to the drive mechanism 170.

Next, change of the vehicle speed of the subject vehicle controlled by the above-mentioned control flow is explained.

Figure 4:
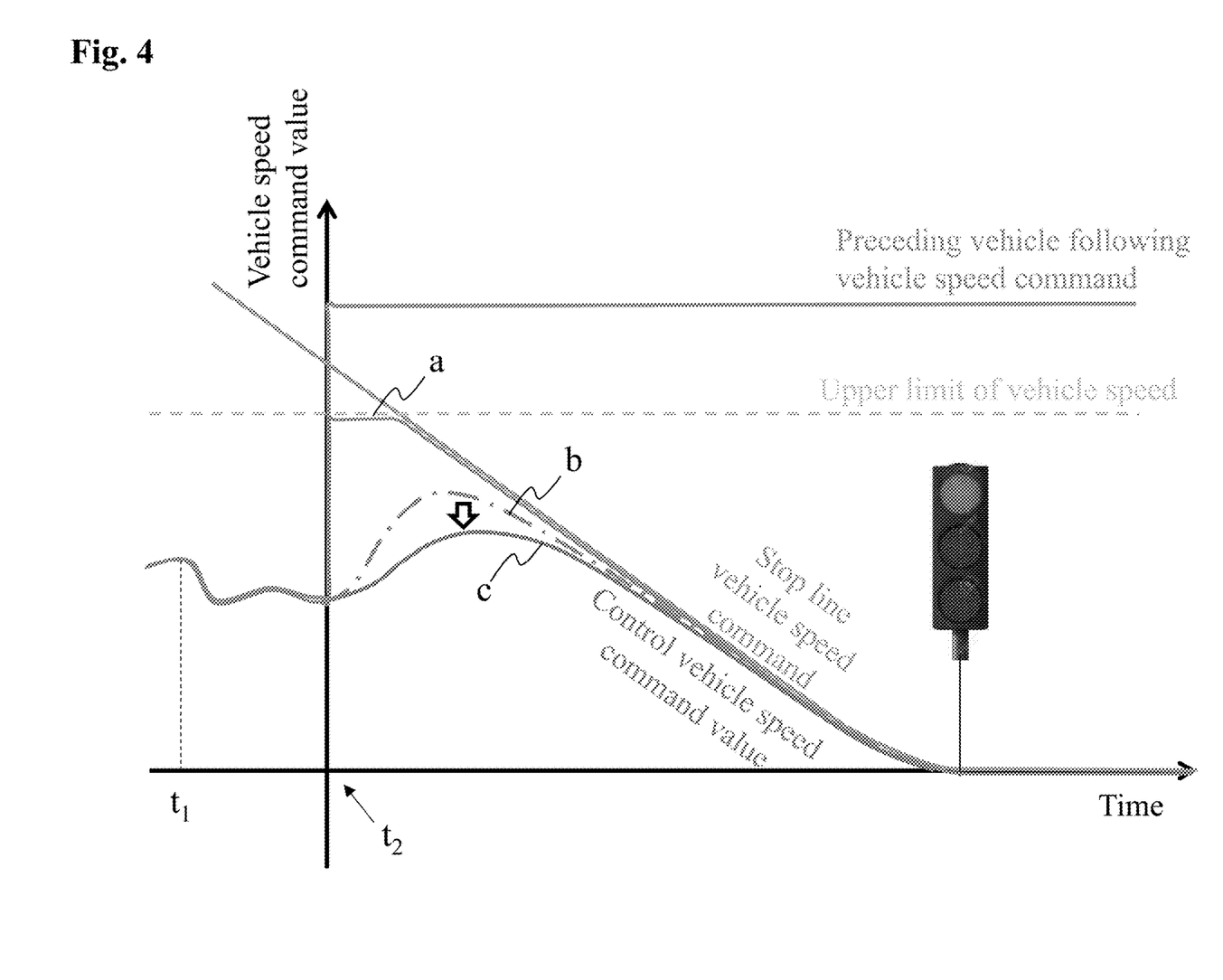
FIG. 4 is a graph for explaining the characteristics of the vehicle speed command value.

FIG. 4 is a graph illustrating the characteristics of the vehicle speed command value when the preceding vehicle makes the lane change while the subject vehicle follows the preceding vehicle. In FIG. 4, the horizontal axis indicates the time, the vertical axis indicates the vehicle speed command value. The subject vehicle is following the preceding vehicle by autonomous driving control. The intersection exists ahead of the subject vehicle and the preceding vehicle, and the lighting state is the stop instruction. For example, it is assumed that at the time $t_1$, the driver of the preceding vehicle visually notices the intersection and slows down the vehicle. The subject vehicle also decelerates to follow the preceding vehicle. At the time of $t_2$, it is assumed that the preceding vehicle makes the lane change for any reason.

Unlike the present embodiment, when the look-ahead vehicle speed command value is not calculated, the control device 180 increases the vehicle speed command value so that the subject vehicle follows the preceding vehicle. In the example of FIG. 4, since the vehicle speed set by the driver is lower than the vehicle speed of the preceding vehicle, the vehicle speed set by the driver is the upper limit of the vehicle speed, and the control device 180 sets the vehicle speed command value to a vehicle speed command value corresponding to the upper limit of the vehicle speed (see the graph a in FIG. 4).

In addition, when the look-ahead time is fixed, the vehicle speed command value changes as shown in the graph b of FIG. 4. When the look-ahead time is set, the acceleration after time $t_2$ is hindered. When the vehicle speed command value matches the stop line vehicle speed command value, the vehicle speed command value changes along the stop line vehicle speed command value.

In the present embodiment, since the lighting state is the stop instruction, the look-ahead time is set to be long. The vehicle speed command value changes as shown in the graph c of FIG. 4. That is, compared with the graph b, the acceleration after the time $t_2$ is hindered more. When the vehicle speed command value matches the stop line vehicle speed command value, the vehicle speed command value changes along the stop line vehicle speed command value. As a result, the unnecessary acceleration is hindered, and too strong acceleration is also hindered. In addition, the change to the deceleration is also smoothed.

Figure 5:
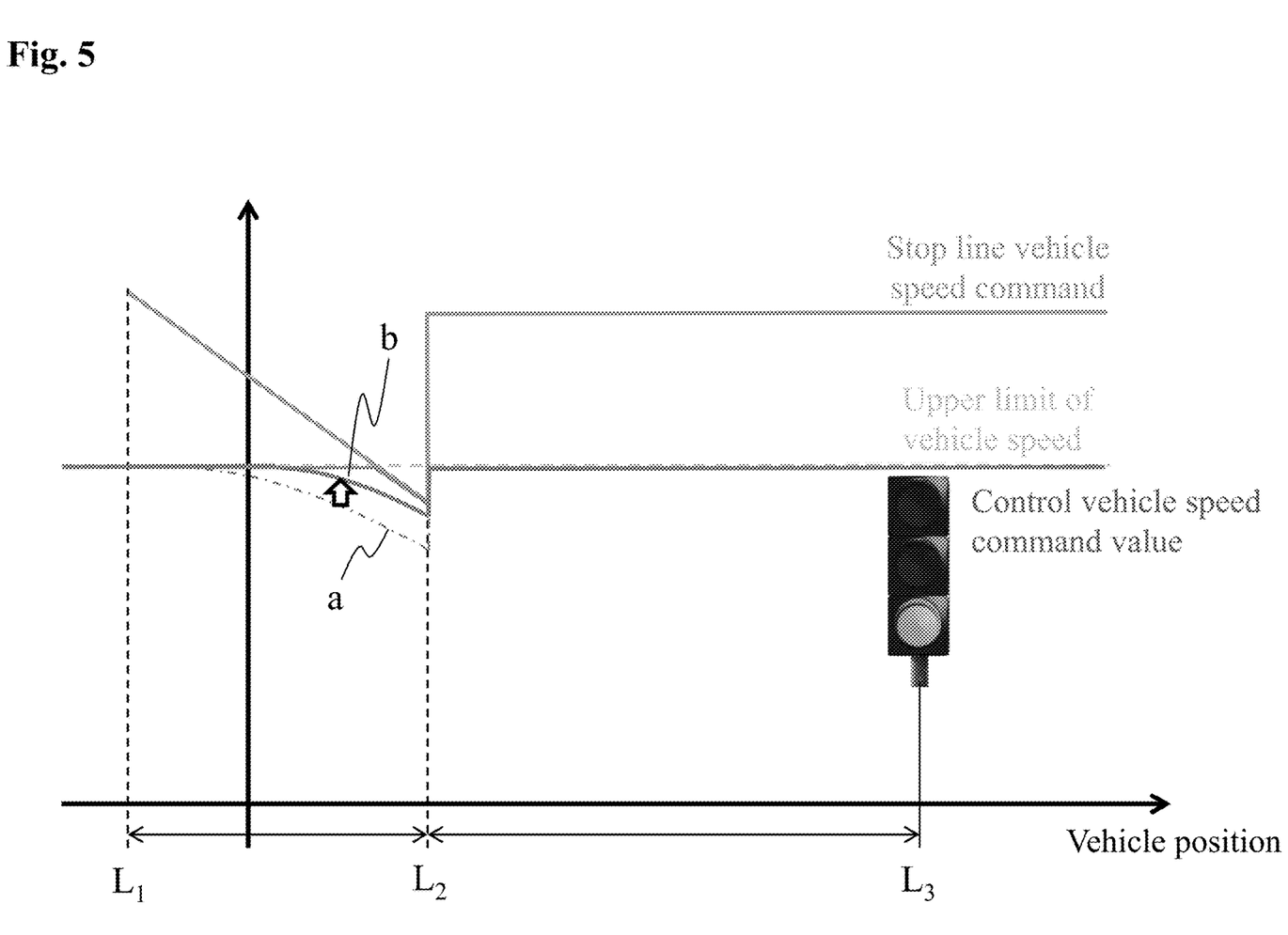
FIG. 5 is a graph for explaining the characteristics of the vehicle speed command value.

FIG. 5 is a graph illustrating the characteristics of the vehicle speed command value when the subject vehicle travels toward the traffic light. In FIG. 5, the horizontal axis indicates the position of the subject vehicle, the vertical axis indicates the vehicle speed command value. In the graph of FIG. 5, while the subject vehicle travels from $L_1$ to $L_2$, the travel assisting device 100 cannot detect the lighting state of the traffic light. While the subject vehicle travels from $L_2$ to $L_3$, the travel assisting device 100 can detect the lighting state of the traffic light.

While the subject vehicle travels from $L_1$ to $L_2$, the control device 180 acquires the information of the stop line (in the example of FIG. 5, the positional information of the traffic light) and calculates the look-ahead vehicle speed command value. The look-ahead vehicle speed command value is a vehicle speed command value to stop in front of the intersection with respect to the current vehicle speed. Although the lighting state of the traffic light is not detectable, since it can be recognized that the traffic light is placed in front of the subject vehicle, the control device 180 performs the deceleration control before the subject vehicle reaches the position $L_2$.

When the look-ahead time is fixed, the vehicle speed command value changes as shown in the graph a of FIG. 5. In the present embodiment, when the lighting state cannot be detected, the look-ahead time is set to be shorter than that set when the lighting state can be detected. Thus, as shown in the graph b, in the present embodiment, the timing of the deceleration is delayed as compared with the graph a, and the amount of deceleration is reduced as compared with the graph a. As a result, the excessive decelerate is hindered when the lighting state is not detected. Further, as the subject vehicle reaches the position $L_2$, the control device 180 can detect the lighting state of the traffic light by using the camera 150 and the like. In the example of FIG. 5, since the lighting state is the through instruction, the control device 180 recognizes that the vehicle does not need to stop in front of the intersection, and increases the vehicle speed command value up to the upper limit that is the legal speed limit.

Figure 6:
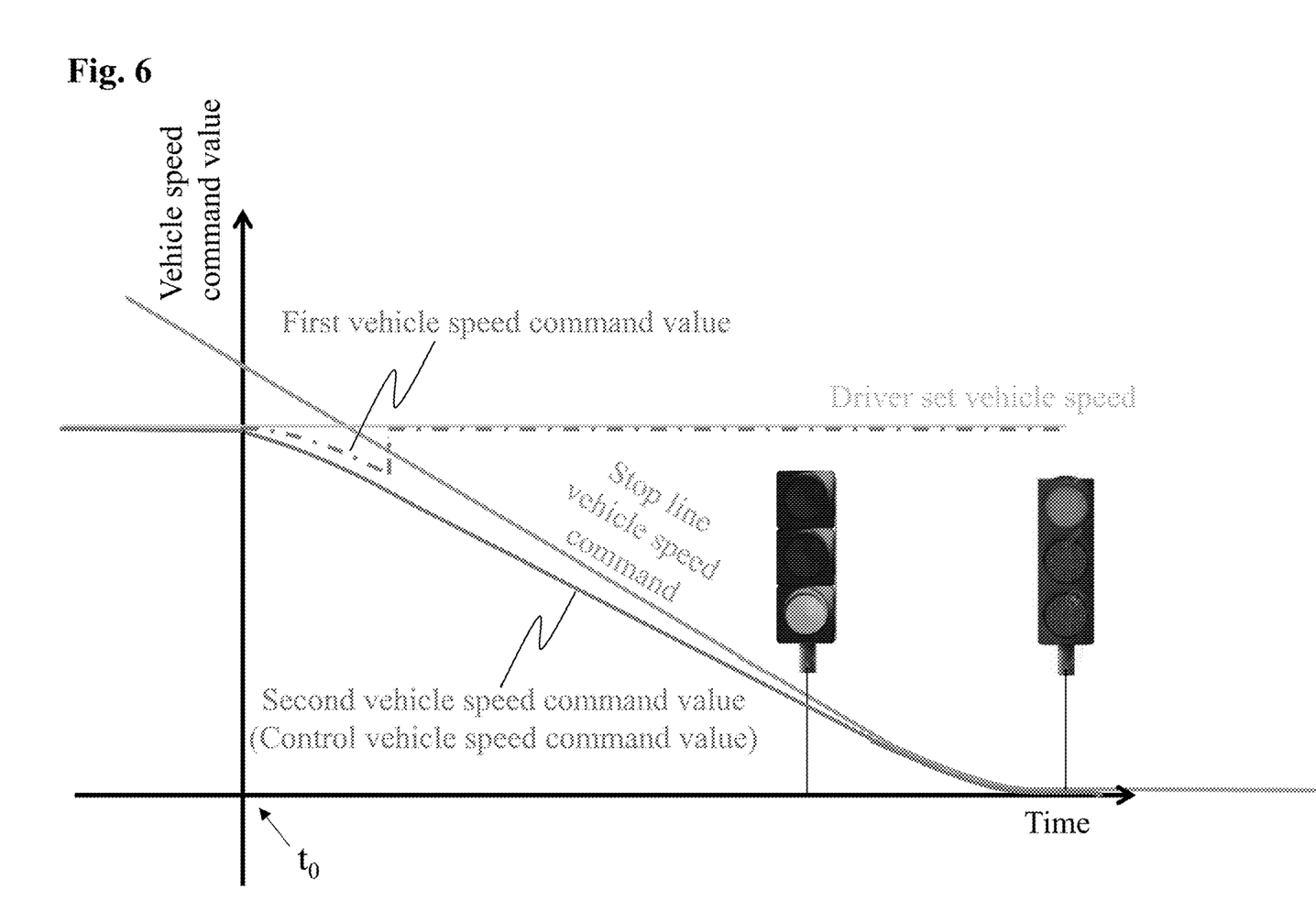
FIG. 6 is a graph for explaining the characteristics of the vehicle speed command value.

FIG. 6 is a graph illustrating the characteristics of the vehicle speed command value when the subject vehicle travels toward the traffic light. In FIG. 6, the lighting state of the traffic light located close to the subject vehicle (hereinafter referred to as a "first traffic light") is the through instruction, and the lighting state of the traffic light located far from the subject vehicle (hereinafter referred to as a "second traffic light") is the stop instruction. It is assumed that at the time to, the lighting state of the first traffic light cannot be detected, and the lighting state of the second traffic light can be detected by the subject vehicle.

When a plurality of the traffic lights is detected as the features existing ahead of the subject vehicle in the travelling direction, the control device 180 sets the look-ahead time according to the lighting state of each traffic light. In the example of FIG. 6, since the lighting state of the first traffic light is not detected, the control device 180 sets a short look-ahead time corresponding to the first traffic light (hereinafter referred to as a "first look-ahead time"). On the other hand, since it can be detected that the lighting state of the second traffic light is the stop instruction, the control device 180 sets a longer look-ahead time corresponding to the second traffic light (hereinafter referred to as a "second look-ahead time"). The first look-ahead time is shorter than the second look-ahead time.

The control device 180 calculates the look-ahead vehicle speed command value corresponding to a plurality of the look-ahead times. That is, the control device 180 calculates a vehicle speed command value in the case of setting the first the look-ahead time (hereinafter referred to as a "first vehicle speed command value") and a vehicle speed command value in the case of setting the second look-ahead time (hereinafter referred to as a "second vehicle speed command value"). The control device 180 calculates the lower command value of the first vehicle speed command value and the second vehicle speed command value as the control vehicle speed command value.

As shown in FIG. 6, the control device 180 calculates the second vehicle speed command value that is lower than the first vehicle speed command value as the control vehicle speed command value. This allows the vehicle speed to be controlled so that the vehicle can stop at the stop line right before even though the plurality of the traffic lights are installed and the lighting state of the traffic light closer to the subject vehicle is not detected.

In the present embodiment, as described above, the control device 180 generates the vehicle speed command value based on the vehicle information of the subject vehicle, calculates the look-ahead vehicle speed command value of the predetermined time (the look-ahead time) ahead of the present time based on the information of the features that exists ahead of the subject vehicle in the travelling direction, and controls the subject vehicle based on the look-ahead vehicle speed command value. In addition, the lighting state of the traffic light located around the subject vehicle is detected, and the look-ahead time is set based on the lighting state. This allows to hinder the unnecessary acceleration before the traffic light indicating the stop instruction.

In the present embodiment, when the lighting state is the stop instruction, the look-ahead time is set longer than that when the lighting state is an instruction other than the stop instruction. Thus, when the traffic light is the stop instruction (presented in red), by increasing the look-ahead time, the unnecessary acceleration before the stop line is hindered, and the timing of deceleration is advanced. As a result, a sense of security is provided for passengers.

In the present embodiment, when the lighting state cannot be detected, the look-ahead time is shortened as compared with the case in which the lighting state is detected. This reduces the look-ahead time when the subject vehicle is at a distance at which the lighting state is detected although the traffic light is the through instruction (presented in blue), thereby the unnecessary deceleration before the stop line is hindered. As a result, a sense of discomfort given to the passengers is decreased.

In the present embodiment, the plurality of the traffic light are detected, the look-ahead time is set for each of the plurality of the traffic light detected, the look-ahead vehicle speed command value is calculated corresponding to each of the plurality of the look-ahead time, and the subject vehicle is controlled based on the smallest vehicle speed command value among the plurality of the look-ahead vehicle speed command value. This allows the vehicle speed to be controlled so that the vehicle can stop at the stop line right before even tough, for example, the plurality of the traffic light are installed and the lighting state of the traffic light closer to the subject vehicle cannot be detected.

Further, as a modification of the present embodiment, when a state in which the lighting state of the traffic light is detected to be the stop instruction switches to a state in which the lighting state of the traffic light cannot be detected, the control device 180 increases the look-ahead time as compared with the look-ahead time when it is detected that the lighting state is the stop instruction. For example, when a state in which the stop instruction is detectable to a state in which the lighting state is temporarily undetectable, the look-ahead time is increased to hinder change of the deceleration rate.

As a modification of the present embodiment, when changing the look-ahead time, the control device 180 may limit the amount of change in the look-ahead time to a predetermined amount of change or less. This enables to hinder the sudden change in the acceleration rate during the deceleration or acceleration.

In the present embodiment, when the feature are detected, the travelling direction of the subject vehicle is not necessarily limited to the front of the subject vehicle. For example, as the subject vehicle travels, when a branch exists ahead of the subject vehicle and the subject vehicle plans to change lanes, the feature located in the travelling direction after the lane change may be detected.

Second Embodiment

A travel assisting device according to another embodiment of the present invention will be described. The present embodiment differs from the above-described first embodiment in a calculation method for the target vehicle speed and the target acceleration rate in the control device 180. The other configurations and control processes are the same as those of the first embodiment described above, and the description thereof is incorporated as appropriate.

The control device 180 calculates the look-ahead vehicle speed command value by the calculation method described below.

Figure 7:
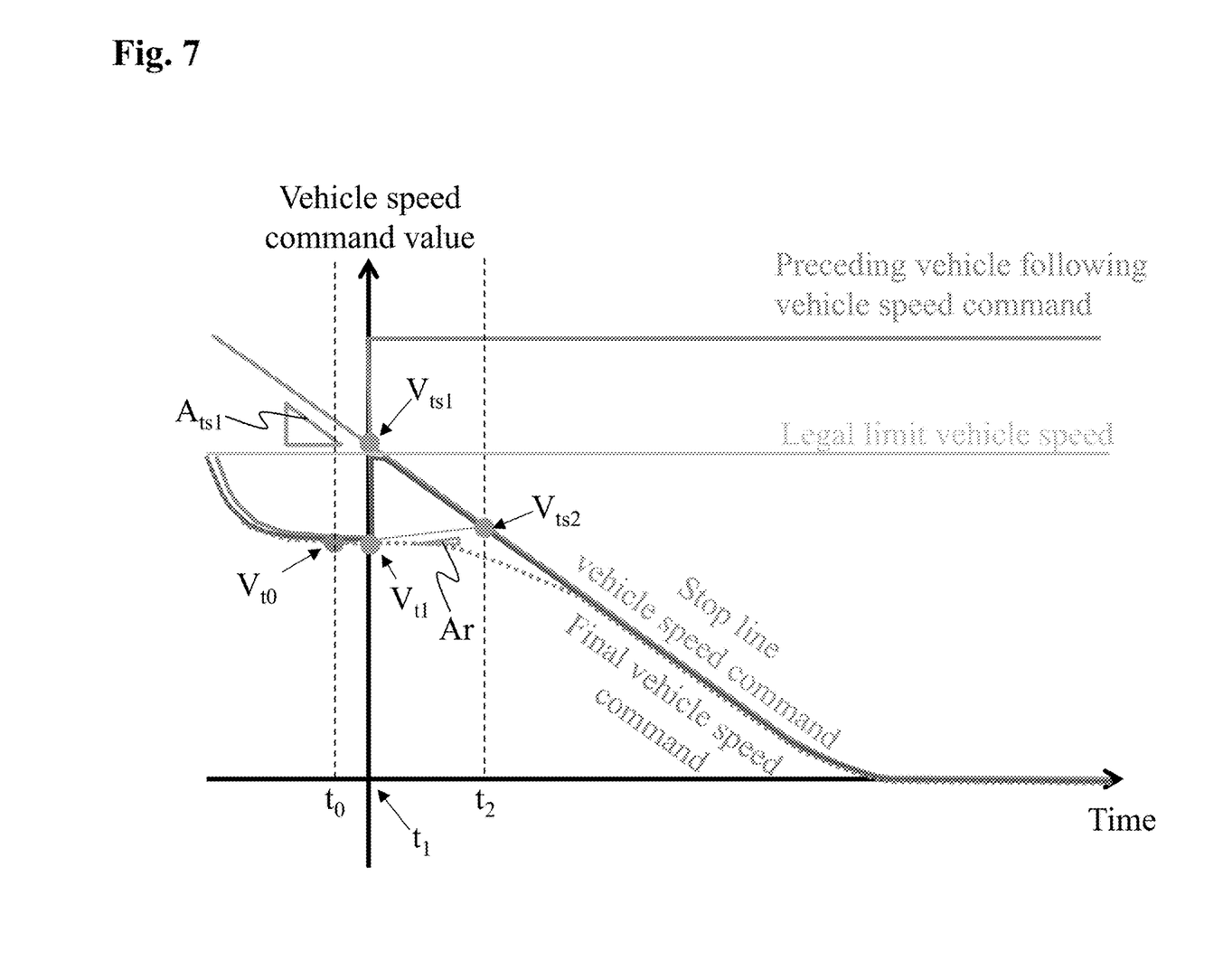
FIG. 7 is a graph for explaining the characteristics of the vehicle speed command value.

FIG. 7 is a graph illustrating the characteristics of the vehicle speed command value when the preceding vehicle makes the lane change while the subject vehicle follows the preceding vehicle. In FIG. 7, the horizontal axis indicates the time, and the vertical axis indicates the vehicle speed command value. The subject vehicle is following the preceding vehicle by autonomous driving control. The intersection exists in front of the subject vehicle and the preceding vehicle, and the lighting state is the stop instruction. The time $t_1$ indicates the current time, and the time to indicates the time one cycle before the current time $t_1$ in the calculation cycle. The time between $t_1$ and $t_2$ indicates the look-ahead time.

At the time $t_1$, the control device 180 acquires the information of the stop line by the stop line acquiring function and calculates the distance from the current position of the subject vehicle to the stop line. The stop line is located near the traffic light. The control device 180 calculates the stop line vehicle speed command according to the distance to the stop line. The stop line vehicle speed command indicates a target vehicle speed to stop before the stop line with respect to the position of the subject vehicle (hereinafter, also referred to as a "target stopping vehicle speed"). In addition, the control device 180 calculates a target acceleration rate to stop before the stop line in view of an amount of reduction in the vehicle speed indicated by the stop line vehicle speed command (hereinafter, also referred to as a "target stopping acceleration rate"). Thus, the control device 180 calculates the current target stopping vehicle speed ($V_{ts1}$) and the current target stopping acceleration rate ($A_{ts1}$) based on the current vehicle information.

The control device 180 sets the look-ahead time based on the lighting state of the traffic light. The control device 180 calculates the look-ahead target vehicle speed ($V_{ts2}$) based on the current target stopping vehicle speed ($V_{ts1}$) and the current target stopping acceleration rate ($A_{ts1}$).

The look-ahead target vehicle speed (Vts2) is a target vehicle speed at time ($t_2$) ahead of the current time ($t_1$) by the look-ahead time. The control device 180 calculates the look-ahead target vehicle speed ($V_{ts2}$) by multiplying the look-ahead time by the target stopping acceleration rate ($A_{ts1}$) to calculate the amount of reduction of velocity in the look-ahead time and by adding the amount of reduction of velocity to the current target stopping vehicle speed ($V_{ts1}$).

The control device 180 calculates the required acceleration rate ($A_r$) required to change the previous target vehicle speed ($V_{r0}$) to the look-ahead target vehicle speed ($V_{ts2}$) based on the target vehicle speed calculated in the previous calculation cycle ($V_{r0}$) and the look-ahead target vehicle speed ($V_{ts2}$). The control device 180 calculates the required acceleration rate ($A_r$) by calculating the difference of velocity between the target vehicle speed ($V_{r0}$) and the look-ahead target vehicle speed ($V_{ts2}$) and dividing the calculated difference of velocity by the time from the time (to) which is included in the previous calculation cycle to the time ($t_2$).

Then, the control device 180 calculates the current target vehicle speed based on the target vehicle speed ($V_{r0}$) and the required acceleration rate ($A_r$). Specifically, the control device 180 calculates the current target vehicle speed ($V_{r1}$) by calculating the change amount of velocity by multiplying the required acceleration rate ($A_r$) by a time of the calculation cycle, and adding the calculated change amount of velocity to the target vehicle speed ($V_{r0}$).

As described above, in the present embodiment, the control device 180 calculates the target stopping vehicle speed ($V_{ts1}$) and the target stopping acceleration rate ($A_{ts1}$) for the subject vehicle to stop in the vicinity of the traffic light based on the vehicle information, calculates the look-ahead target vehicle speed ($V_{ts2}$) based on the current target stopping vehicle speed ($V_{ts1}$) and the current target stopping acceleration rate ($A_{ts1}$), calculates the required acceleration rate ($A_r$) required to change the vehicle speed ($V_{r0}$) indicated by the previous vehicle speed command value to the look-ahead target vehicle speed ($V_{ts2}$), and calculates the current target vehicle speed ($V_{r1}$) based on the calculation cycle of the vehicle speed command value and the required acceleration rate ($A_r$). This allows the target vehicle speed after the look-ahead time to be calculated from the target stopping vehicle speed ($V_{ts1}$) and the target stopping acceleration rate ($A_{ts1}$) when the target vehicle speed after the look-ahead time cannot be directly calculated. Further, the present target vehicle speed ($V_{r1}$) can be calculated from the look-ahead target vehicle speed ($V_{ts2}$) and the vehicle speed indicated by the previous vehicle speed command value ($V_{r0}$).

Third Embodiment

A travel assisting device according to another embodiment of the present invention will be described. The present embodiment differs from the above-described second embodiment in that an upper limit is set for the acceleration rate with respect to the required acceleration rate. The other configurations and control processes are the same as those of the above-mentioned second embodiment, and the description thereof is incorporated as appropriate.

Figure 8:
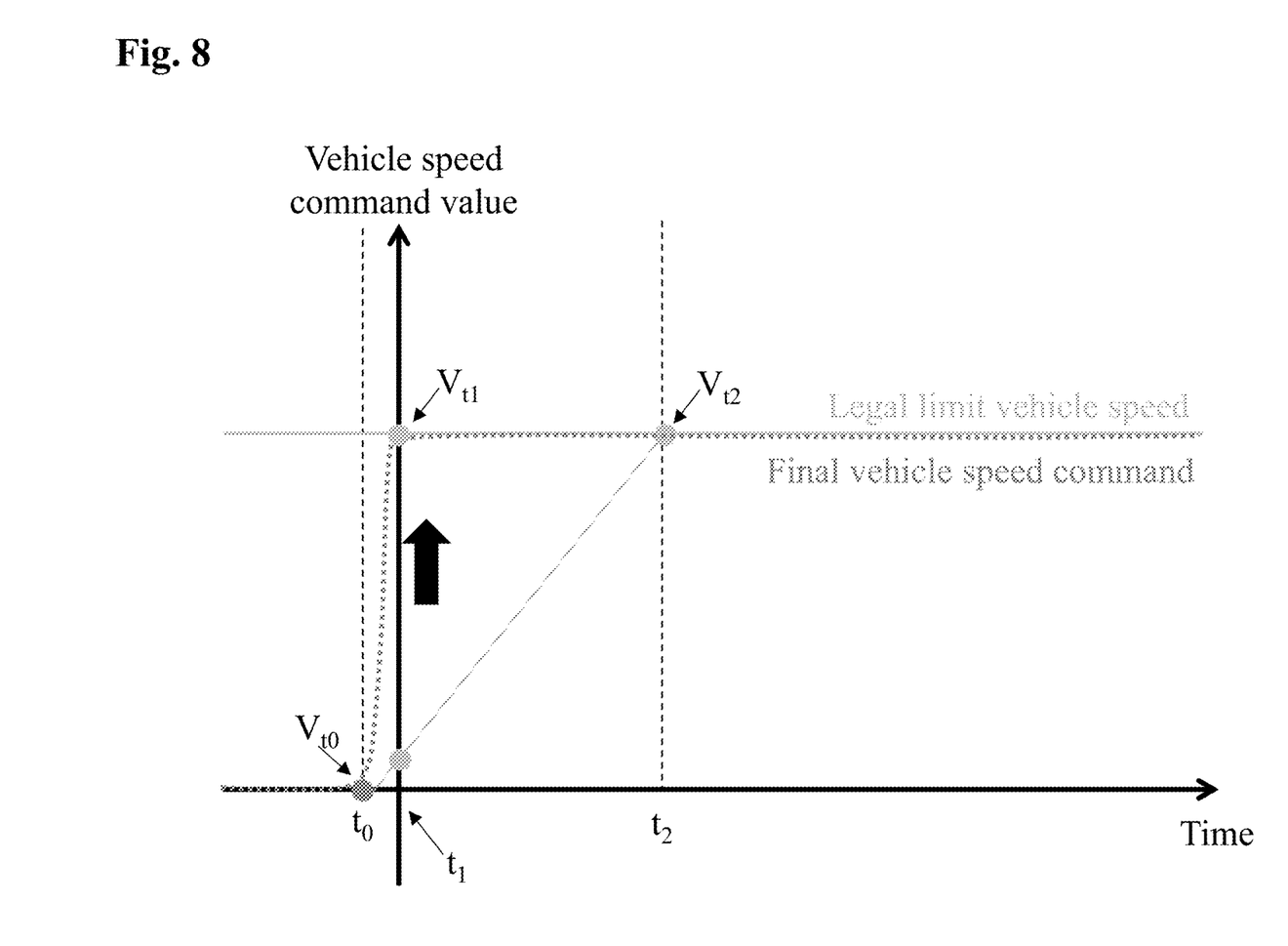
FIG. 8 is a graph for explaining the characteristics of the vehicle speed command value.

FIG. 8 is a graph illustrating the characteristics of the vehicle speed command value when the preceding vehicle makes the lane change while the subject vehicle follows the preceding vehicle. In FIG. 8, the horizontal axis indicates the time, and the vertical axis indicates the vehicle speed command value. The subject vehicle is following the preceding vehicle by autonomous driving control. The intersection exists in front of the subject vehicle and the preceding vehicle, and the lighting state is the stop instruction. The time $t_1$ indicates the current time, and the time $t_0$ indicates a time one cycle before the current time $t_1$ in the calculation cycle. The time between $t_1$ and $t_2$ indicates the look-ahead time.

In the present embodiment, the upper limit of the acceleration rate is preset for the required acceleration rate $(A_r)$. The control device 180 calculates the required acceleration rate $(A_r)$ based on the target vehicle speed $(V_{r0})$ calculated in the previous calculation cycle and the look-ahead target vehicle speed $(V_{ts2})$, and then compares the calculated required acceleration rate $(A_r)$ and the upper limit of the acceleration rate. When the required acceleration rate $(A_r)$ is higher than the upper limit of the acceleration rate, the control device 180 selects the target vehicle speed indicated by the current vehicle speed command value as the target vehicle speed for the vehicle control instead of the look-ahead target vehicle speed. The target vehicle speed indicated in the current vehicle speed command value is, for example, a vehicle speed determined by a required torque that depends on an operation of an accelerator. For example, when the vehicle speed is controlled based on the look-ahead target vehicle speed while an acceleration is requested due to the operation of the accelerator by the driver between $t_0$ and $t_1$, the acceleration may be hindered. Therefore, in the present embodiment, when the required acceleration rate $(A_r)$ is higher than the upper limit of the acceleration rate, the look-ahead target vehicle speed is not selected as the vehicle speed for the control.

On the other hand, when the required acceleration rate $(A_r)$ is less than or equal to the upper limit of the acceleration rate, the control device 180 calculates the current target vehicle speed based on the target vehicle speed $(V_{r0})$ and the required acceleration rate $(A_r)$. Then, the control device 180 selects the current target vehicle speed calculated based on the required acceleration rate $(A_r)$ as the target vehicle speed for the control.

As described above, in the present embodiment, when the required acceleration rate $(A_r)$ is higher than the predetermined upper limit of the acceleration rate, the control device 180 selects the target vehicle speed indicated by the current vehicle speed command value, instead of the look-ahead target vehicle speed $(V_{ts2})$, as the target vehicle speed for the vehicle control. This allows the vehicle speed command value to be increased instantly.

Fourth Embodiment

A travel assisting device according to another embodiment of the present invention is described. This embodiment differs from the above-mentioned second embodiment in that a tolerance is set for the look-ahead target vehicle speed $(V_{ts2})$. The other configurations and control processes are the same as those of the second embodiment as described above, and the description of the second embodiment or the third embodiment is incorporated as appropriate.

Figure 9:
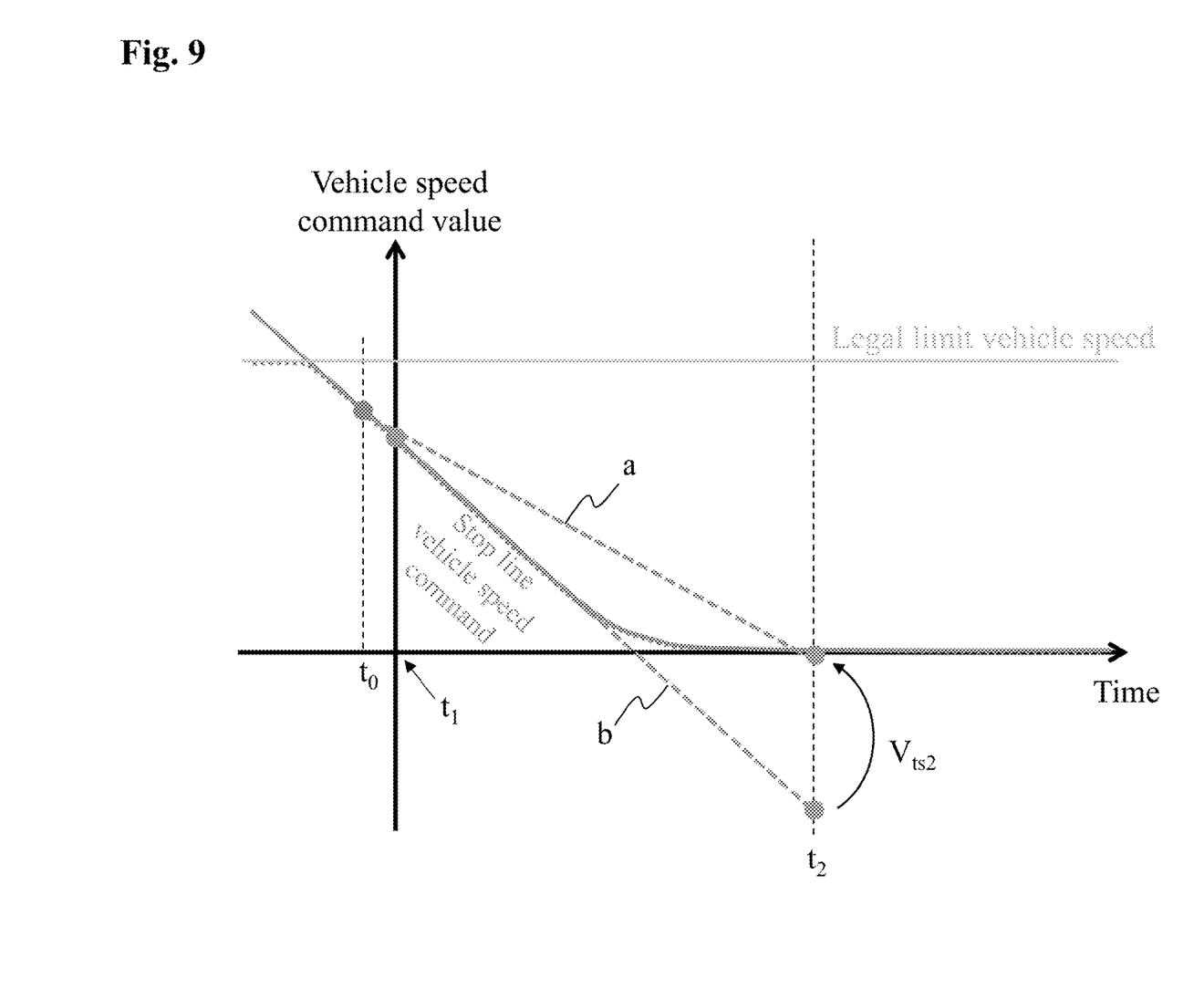
FIG. 9 is a graph for explaining the characteristics of the vehicle speed command value.

FIG. 9 is a graph illustrating the characteristics of the vehicle speed command value when the preceding vehicle makes the lane change while the subject vehicle follows the preceding vehicle. In FIG. 9, the horizontal axis indicates the time, and the vertical axis indicates the vehicle speed command value. The subject vehicle is following the preceding vehicle by the autonomous driving control. The intersection exists in front of the subject vehicle and the preceding vehicle, and the lighting state is the stop instruction. The time $t_1$ indicates the current time, and the time $t_0$ indicates the time one cycle before the current time $t_1$ in the calculation cycle. The time between $t_1$ and $t_2$ indicates the look-ahead time.

For example, in a scene in which the subject vehicle approaches the stop line and the distance to the stop line is shortened, as shown in graph b of FIG. 9, the slope of the stop line vehicle speed command increases negatively, and the look-ahead target vehicle speed $(V_{ts2})$ may become negative. And, when the vehicle speed is controlled based on the negative look-ahead target vehicle speed $(V_{ts2})$, a lot of braking is required in the vicinity of the stop line, and behavior of the vehicle when the vehicle stops becomes large. In the present embodiment, to prevent the behavior of the vehicle from becoming large when the vehicle stops, the tolerance is set for the look-ahead target vehicle speed $(V_{ts2})$.

The tolerance of the look-ahead target vehicle speed $(V_{ts2})$ is set to positive. The control device 180 calculates the look-ahead target vehicle speed $(V_{ts2})$ and then compares the calculated look-ahead target vehicle speed $(V_{ts2})$ to the lower limit value of the tolerance. The lower limit value of the tolerance is zero. And, when the look-ahead target vehicle speed $(V_{ts2})$ is lower than the lower limit value of the tolerance, that is, when the look-ahead target vehicle speed $(V_{ts2})$ is a negative value, the control device 180 limits the look-ahead target vehicle speed $(V_{ts2})$ within the tolerance so that the look-ahead target vehicle speed $(V_{ts2})$ is a positive value.

As shown in FIG. 9, a graph a illustrates the limited look-ahead target vehicle speed $(V_{ts2})$. As shown in the graph a, since the look-ahead target vehicle speed $(V_{ts2})$ is limited to the lower limit value of zero, the slope indicating the stop line vehicle speed command becomes gentler than that of a graph b. As a result, the vehicle can stop at the stop line smoothly.

As described above, in the present embodiment, the look-ahead target vehicle speed is limited within the predetermined tolerance, thereby, the target vehicle speed of the current time is prevented from being negative to allow the vehicle to stop at the stop line smoothly.

LIST OF REFERENCES

100 . . . Travel assisting device
110 . . . Subject vehicle position detecting device
120 . . . Map database
130 . . . Vehicle speed sensor
140 . . . Ranging sensor
150 . . . Camera
160 . . . Input device
170 . . . Drive mechanism
180 . . . Control device
190 . . . Yaw rate sensor

The invention claimed is:
1. A travel assisting method for a vehicle having a processor, comprising:

generating a vehicle speed command value for controlling a vehicle speed of a subject vehicle based on vehicle information of the subject vehicle;

calculating the vehicle speed command value at a predetermined time ahead of a current time based on information of a feature existing ahead of the subject vehicle in a travelling direction, as a look-ahead vehicle speed command value;

controlling the subject vehicle based on the look-ahead vehicle speed command value;

detecting a lighting state of a traffic light located around the subject vehicle and included in the feature; and when the lighting state indicates a stop instruction, setting the predetermined time longer than that when the lighting state indicates an instruction other than the stop instruction.

2. A travel assisting method for a vehicle having a processor, comprising:

generating a vehicle speed command value for controlling a vehicle speed of a subject vehicle based on vehicle information of the subject vehicle;

calculating the vehicle speed command value at a predetermined time ahead of a current time based on information of the feature existing ahead of the subject vehicle in a travelling direction, as a look-ahead vehicle speed command value;

controlling the subject vehicle based on the look-ahead vehicle speed command value;

detecting a lighting state of a traffic light located around the subject vehicle and included in the feature; and when the lighting state cannot be detected, setting the predetermined time shorter than that when the lighting state can be detected.

3. The travel assisting method of claim 1, wherein when the lighting state changes from a state in which the lighting state is detected to indicate a stop instruction to a state in which the lighting state cannot be detected, the predetermined time is set longer than that when the lighting state is detected to indicate the stop instruction.

4. The travel assisting method of claim 1, wherein when changing the predetermined time, a change amount of the predetermined time is limited to a predetermined threshold value or less.

5. The travel assisting method of claim 1, further comprising:

detecting a plurality of the traffic lights;

setting the predetermined time for the plurality of the detected traffic lights;

calculating the look-ahead vehicle speed command value for each of the plurality of the predetermined times set; and controlling the subject vehicle based on the smallest vehicle speed command value of the plurality of the look-ahead vehicle speed command values calculated.

6. The travel assisting method of claim 1, further comprising:

calculating each of a target stopping vehicle speed and a target stopping acceleration rate to stop the subject vehicle near the traffic light based on the vehicle information;

calculating a look-ahead target vehicle speed that is a target vehicle speed at the predetermined time ahead of the current time based on the current target stopping vehicle speed and the current target stopping acceleration rate;

calculating a required acceleration rate that is required to change the vehicle speed from a vehicle speed indicated by the previous vehicle speed command value to the look-ahead target vehicle speed; and calculating a current target vehicle speed based on a calculation cycle of the vehicle speed command value and the required acceleration rate.

7. The travel assisting method of claim 6, further comprising:

selecting a target vehicle speed indicated by the current vehicle speed command value as a target vehicle speed for controlling the subject vehicle instead of the look-ahead target vehicle speed when the required acceleration rate is higher than a predetermined upper limit of an acceleration rate.

8. The travel assisting method of claim 6, wherein the look-ahead target vehicle speed is limited within a predetermined allowable range.

9. A travel assisting device for a vehicle comprising a processor configured to:

generate a vehicle speed command value for controlling a vehicle speed of a subject vehicle based on vehicle information of the subject vehicle;

calculate the vehicle speed command value at a predetermined time ahead of a current time based on information of a feature existing ahead of the subject vehicle in a travelling direction, as a look-ahead vehicle speed command value;

control the subject vehicle based on the look-ahead vehicle speed command value;

detect a lighting state of a traffic light located around the subject vehicle and included in the feature; and when the lighting state indicates a stop instruction, set the predetermined time longer than that when the lighting state indicates an instruction other than the stop instruction.

10. A travel assisting device for a vehicle comprising a processor configured to:

generate a vehicle speed command value for controlling a vehicle speed of a subject vehicle based on vehicle information of the subject vehicle;

calculate the vehicle speed command value at a predetermined time ahead of a current time based on information of a feature existing ahead of the subject vehicle in a travelling direction, as a look-ahead vehicle speed command value;

control the subject vehicle based on the look-ahead vehicle speed command value;

detect a lighting state of a traffic light located around the subject vehicle and included in the feature; and when the lighting state cannot be detected, set the predetermined time shorter than that when the lighting state can be detected.

* * * * *